United States Patent [19]

Henriksson

[11] 4,013,749
[45] Mar. 22, 1977

[54] METHOD OF SHAPING FIBER MATERIALS

[76] Inventor: Sten Thore Henriksson, Erik Sjobloms vag 8, S-890 23 Sjalevad, Sweden

[22] Filed: June 24, 1975

[21] Appl. No.: 589,956

[52] U.S. Cl. ............................................. 264/128
[51] Int. Cl.² ......................................... B29J 5/02
[58] Field of Search ........................... 264/128, 109

[56] References Cited

UNITED STATES PATENTS

| | | | |
|---|---|---|---|
| 3,051,679 | 8/1962 | Forsyth | 264/128 |
| 3,259,536 | 7/1966 | Gaeth et al. | 264/128 |
| 3,762,974 | 10/1973 | Wirz | 264/128 |
| 3,849,527 | 11/1974 | Drostholm | 264/128 |

Primary Examiner—Robert F. White
Assistant Examiner—James R. Hall
Attorney, Agent, or Firm—Fred Philpitt

[57] ABSTRACT

The present invention is concerned with a method of shaping fiber materials. Particularly, it relates to the shaping of cellulose-containing fiber materials such as wood fibers and the like. Synthetic fiber materials such as mineral fibers are also contemplated. The method is of that type which uses water as a binder for the fibers. In order to cause the water glass to exert its binding function a substance capable of splitting off acetic acid is added thereto and the acetic acid is liberated at temperatures between 150° and 200° C. Vinyl acetate is preferably used as an agent for splitting off acetic acid to cause gelation and binding to take place.

4 Claims, No Drawings

METHOD OF SHAPING FIBER MATERIALS

The present invention is concerned with a method of shaping fibre materials. Particularly, it relates to the shaping of cellulose-containing fibre materials such as wood fibres and the like, but also synthetic fibre materials such as mineral fibres (glass fibres, slag fibres and similar). More particularly, the invention relates to such shaping that results in flat objects, for example plates, sheets, board or similar. The invention is particularly concerned with the manufacture of board of wood fibre, chip board, cardboard and the like.

The invention relates to an improvement of the so-called dry method for shaping the fibre materials in question, the starting material being a mass of the fibre material collected from a suspension thereof.

The invention is characterized in that an aqueous solution of water glass and a substance capable of splitting off acetic acid in the presence of water is supplied to the collected mass of the fibre material, whereupon the added binder is caused to exert its function while holding together the fibres by adhesion. For this purpose there is usually required an increase in temperature up to a value at which acetic acid is split off from the compound in question thereby to permit silicic acid gel to be formed from the water glass, said gel representing the binding substance. Suitable temperatures at which the acetic acid is split off from the compounds in question is usually between 90° and 200° C, preferably between 150° and 200° C.

In most cases a pressing has to be carried out at the same time as the water glass is caused to exert its binding function.

According to the present invention there is achieved a very fire proof, moisture proof and shape stable product. The split off acetic acid yields a very little attack on the fibre material which is an advantage in comparison with known processes using synthetic resins of melamine, carbamide or phenol condensates as binder. Such binders contain ammonium chloride as a hardener, said compound forming hydrochloric acid under the conditions prevailing in the pressing operation which may have a destroying effect on the fibres.

If the shaping of the fibre material takes place by pressing the latter is usually effected at temperatures between 150° and 200° C.

According to the invention, a preferable effect can be obtained if an acetic acid ester is used as compound capable of splitting off acetic acid in the presence of water. In this connection, it has proved particularly suitable to use vinyl acetate. Good results can also be obtained with ethylene glycolmonoacetic acid ester. The good results by the compounds given above can be explained by the fact that they split off acetic acid slowly. Acetic acid then reacts with the ingredients of the water glass with formation of silicic acid gels. The latter binds the fibres thereby to hold them together by adhesion.

The amount of binder consisting of aqueous mixture containing water glass and a compound capable of splitting off acetic acid can vary within broad limits depending on the fibre weight. It may suitably be so adjusted that the content of binder of the obtained fibre board will be between 1 and 10 percent by weight.

EXAMPLE 770 kg of wood chips calculated on the dry material are mixed with 115.5 kg of water glass calculated as 100 percent (added as 36 percent), 74.5 kg of vinyl acetate and 40 kg of chalk, the latter substance acting as release agent.

The mixture is used as starting material for the manufacture of wood chip board having a thickness of 10 mm. Sheets of the mixture are subjected to pressing at about 175° C and at pressures of 30–32 kp/cm² for 150–180 seconds.

Boards of excellent quality are obtained.

What is claimed is:

1. A method for producing compressed boards by hot pressing which comprises
    a. treating wood chips with an aqueous solution of
        1. water glass, and
        2. a compound capable of liberating acetic acid under the conditions of hot pressing,
    b. hot pressing said treated wood chips under temperature conditions sufficient to cause liberation of acetic acid,
whereby the acetic acid liberated during hot pressing causes gelation of the water glass, which in turn causes binding of the hot pressed wood chips to take place.

2. A method according to claim 1 wherein said compound capable of liberating acetic acid is an acetic acid ester.

3. A method according to claim 2 wherein said compound is vinyl acetate.

4. A method according to claim 2 wherein said compound is ethyleneglycolmonoacetic acid ester.

* * * * *